(12) United States Patent
Yoshimura et al.

(10) Patent No.: US 8,673,796 B2
(45) Date of Patent: Mar. 18, 2014

(54) SPINEL LIGHT-TRANSMITTING WINDOW MATERIAL AND METHOD FOR PRODUCING THE SAME

(75) Inventors: Masashi Yoshimura, Itami (JP); Masaki Fukuma, Osaka (JP); Yutaka Tsuji, Osaka (JP); Shigeru Nakayama, Osaka (JP)

(73) Assignee: Sumitomo Electric Industries, Ltd., Osaka-Shi, Osaka (JP)

( * ) Notice: Subject to any disclaimer, the term of this patent is extended or adjusted under 35 U.S.C. 154(b) by 0 days.

(21) Appl. No.: 13/262,311

(22) PCT Filed: Mar. 31, 2010

(86) PCT No.: PCT/JP2010/055896
§ 371 (c)(1),
(2), (4) Date: Dec. 20, 2011

(87) PCT Pub. No.: WO2010/114035
PCT Pub. Date: Oct. 7, 2010

(65) Prior Publication Data
US 2012/0093713 A1 Apr. 19, 2012

(30) Foreign Application Priority Data
Apr. 2, 2009 (JP) ................................. 2009-090228

(51) Int. Cl.
*C04B 35/00* (2006.01)
(52) U.S. Cl.
USPC ........... 501/120; 264/653; 264/666; 264/681; 423/600
(58) Field of Classification Search
USPC ............ 264/653, 666, 681; 423/600; 501/120
See application file for complete search history.

(56) References Cited

U.S. PATENT DOCUMENTS

| 4,983,555 | A | * | 1/1991 | Roy et al. ....................... 501/120 |
| 5,152,940 | A | * | 10/1992 | Shibata et al. ................ 264/1.21 |
| 2009/0067077 | A1 | * | 3/2009 | Sasame et al. ................. 359/894 |
| 2010/0103356 | A1 | | 4/2010 | Yoshimura et al. |
| 2010/0220393 | A1 | | 9/2010 | Sasame et al. |

FOREIGN PATENT DOCUMENTS

| CN | 101151225 A | 3/2008 |
| JP | 2-18354 A | 1/1990 |
| JP | 2006-315878 A | 11/2006 |
| JP | 2008-214123 A | 9/2008 |
| WO | 2008108276 A1 | 9/2008 |
| WO | WO 2010/11403 A1 | 10/2010 |

OTHER PUBLICATIONS

International Search Report for corresponding PCT Application No. PCT/JP2010/055896, Jun. 29, 2010, pp. 1-2.
Notification of Office Action for corresponding Chinese Patent Application No. 201080015912.6, dated Mar. 22, 2013, pp. 1-7.

* cited by examiner

*Primary Examiner* — Steven Bos
(74) *Attorney, Agent, or Firm* — Ditthavong Mori & Steiner, P.C.

(57) ABSTRACT

To provide a light-transmitting window material made of a spinel sintered body, wherein the largest diameter of pores contained in the light-transmitting window material is not more than 100 μm, and the number of pores having a largest diameter of not less than 10 μm is not more than 2.0 per 1 cm$^3$ of the light-transmitting window material, and wherein light scattering factors are further reduced, and a method for producing a spinel light-transmitting window material including the steps of preparing a spinel molded body; a primary sintering step of sintering the spinel molded body at normal pressure or less or in a vacuum at a temperature in the range of 1500 to 1900° C.; and a secondary sintering step of sintering the spinel molded body under pressure at a temperature in the range of 1500 to 2000° C., wherein the relative density of the spinel molded body after the primary sintering step is 95 to 96% and the relative density of the spinel molded body after the secondary sintering step is 99.8% or more.

2 Claims, No Drawings

SPINEL LIGHT-TRANSMITTING WINDOW MATERIAL AND METHOD FOR PRODUCING THE SAME

TECHNICAL FIELD

The present invention relates to a light-transmitting material of a window (light-transmitting window material) made of a spinel sintered body, which is disposed in electrical equipment or a detector for transmitting light in the visible light region to the middle infrared region, and a method for producing the light-transmitting material.

BACKGROUND ART

A spinel ($MgO$-$nAl_2O_3$) sintered body has high transmittance for light in the visible light region to the middle infrared region, and good corrosion resistance and chemical resistance, and is superior in heat resistance, pressure resistance and mechanical strength. Further, the spinel sintered body has advantages that its properties are easily achieved stably compared with fieldstone such as sapphire and it is free from a problem of birefringence.

Therefore, the spinel sintered body is used as a light-transmitting material for a window (light-transmitting window material) disposed in electrical equipment or a detector for transmitting light in the visible light region to the middle infrared region. Specifically, the spinel sintered body is widely used as light-transmitting materials such as a high-temperature sight glass of a container for producing a semiconductor, a window for receiving infrared rays of sensors for applications of the visible light region to the middle infrared region, for example, an infrared detecting sensor of a missile or a flame detector, a light-receiving window disposed in electrical equipment for receiving signals from a remote controller, and a window of a snooperscope (Patent Literature 1).
Patent Literature 1: Japanese Patent Laying-Open No. 2006-315878

SUMMARY OF INVENTION

Technical Problem

In recent years, more sophisticated performance has been required for windows for the above-mentioned applications with the advance of technology. For example, it is required to further reduce scattering factors of light which the window transmits. Thus, it has been desired to develop a spinel light-transmitting window material in whose light scattering factors are further reduced compared with conventionally known light-transmitting window materials.

It is an object of the present invention to provide a light-transmitting window material made of a spinel sintered body, which is further reduced in light scattering factors than a conventionally known light-transmitting window material. It is another object of the present invention to provide a method for producing the spinel light-transmitting window material.

Solution to Problem

The present inventors made earnest investigations, and consequently found that pores, which are contained in the spinel sintered body composing a light-transmitting window material, act as optical defects of the light-transmitting window material and cause an increase in light scattering factor, that the size and density of the pore have a large effect on scattering factors of light which the window transmits, and that the light scattering factors can be reduced by maintaining the size and density (the number of pores contained in a certain volume) of the pore within a predetermined range, and completed the present invention having the following constitution.

The invention according to claim 1 pertains to a light-transmitting window material made of a spinel sintered body, wherein the light-transmitting window material does not substantially contain pores having a largest diameter of more than 100 μm and the number of pores having a largest diameter of not less than 10 μm is not more than 2.0 per 1 $cm^3$ of the light-transmitting window material.

Since the light-transmitting window material does not contain pores having a largest diameter of more than 100 μm and the number of pores having a largest diameter of not less than 10 μm is not more than 2.0 per 1 $cm^3$ of the light-transmitting window material, the light-transmitting window material is reduced in light scattering factors and can be used as a good light-transmitting window material. Moreover, since the light-transmitting window material is superior in mechanical strength such as break strength and has an improved Weibull coefficient which is an index of variations in strength, a stable product can be attained. The excellent mechanical properties are thought to be brought about by virtue of the smaller number of pores.

The largest diameter of pores in the light-transmitting window material of the present invention is measured by observing a certain region of the light-transmitting window material with a microscope using transmitted light. Generally, the light-transmitting window material is cut into a certain volume (preferably, 10 to 15 mm in thickness, 20 mm in length and 20 mm in width), upper and lower sides of the cut window material are ground, the resulting sample is observed with a microphotograph, and diameters of the pores contained in the microphotograph are measured to obtain a measured value of the largest diameter. When the pore is not spherical, the diameter varies according to the direction of measurement in the pore, and the largest diameter among the different diameters is taken as the largest diameter.

The light-transmitting window material of the present invention is characterized by not substantially containing pores having a largest diameter of more than 100 μm. Here, the expression "not substantially containing" desirably means not to contain pores having a largest diameter of more than 100 μm. However, the expression means that it is allowed to contain a trace of pores having a largest diameter of more than 100 μm to the extent that the gist of the present invention is not impaired, that is, to the extent that no increase in light scattering factors is caused. When the light-transmitting window material does not contain pores having a largest diameter of more than 50 μm, it is preferable since the light scattering factors are further reduced.

Generally, the case, where the above-mentioned measurement is performed on ten samples formed by cutting the window material into a size of 15 mm in thickness, 20 mm in length and 20 mm in width and grinding upper and lower sides of the resulting sample, and pores having a largest diameter of more than 100 μm are not observed in eight or more samples, is considered as a case where the window material does not substantially contain pores having a largest diameter of more than 100 μm. Further, the case, where the above-mentioned measurement is performed on an area of 40 $cm^2$ or more of a sample (or samples) having a thickness of 15 mm and whose upper and lower sides ground, and pores having a largest diameter of more than 100 μm are not observed in 80% or more of the area, is also considered as a case where the window material does not substantially contain pores having a largest diameter of more than 100 μm.

The number of pores having a largest diameter of not less than 10 μm per 1 $cm^3$ of the light-transmitting window material is also measured by observing a certain volume of the light-transmitting window material with a microscope using transmitted light. Generally, the light-transmitting window material is cut into a size of 10 to 15 mm in thickness, 20 mm in length and 20 mm in width (or the window material is cut into a plurality of pieces in such a way that the total volume of the pieces is 4000 to 6000 $mm^3$), upper and lower sides of the cut window material(s) are ground, and the resulting sample is observed with a microphotograph. Whether or not the window material corresponds to the range of the present invention depends on whether the observed number of pores having a largest diameter of not less than 10 μm exceeds 10 or not.

Spinel composing the spinel sintered body is a compound whose molecular formula is represented by $MgO-nAl_2O_3$ (n=1 to 6). In the present invention, the value of n is preferably 1.05 to 1.30, more preferably 1.06 to 1.125, and particularly preferably 1.08 to 1.09.

Elements other than the elements composing spinel contained in the spinel sintered body, that is, impurities, form internal defects such as pores, increase light scattering factors, and deteriorate the resolution of light which the window transmits. The impurities also have effects on transmitting performance and refractive index of the light-transmitting window material. Since these impurities originate from a raw material powder, and are mixed in preparing a sintered body and contained in the spinel sintered body, it is desired that high-purity (preferably, the purity of a component, which is not removed by sintering, is 99.9% by weight or more) spinel is used as a raw material powder, and the impurities are controlled so as not to be mixed in the sintering step described later.

Specific examples of the impurities that are easily mixed in the raw material powder and the impurities that are easily mixed in preparing the sintered body include W, Co, Fe, C, Cu, Sn, Zn, and Ni. It is thought that in the sintering step, these impurities coalesce or are deposited to form impurity particles having a size which adversely affects on optical properties to have an effect on light scattering factors or transmitting performance. The purity of the raw material powder and the sintering step are controlled in such a way that the contents of these impurities in the spinel sintered body are respectively preferably less than 10 ppm, and more preferably less than 5 ppm.

The spinel light-transmitting window material can be produced by a method including the steps of:
  molding a spinel powder to prepare a spinel molded body;
  a primary sintering step of sintering the spinel molded body at normal pressure or less or in a vacuum at a temperature in the range of 1500 to 1900° C.; and
  a secondary sintering step of sintering the spinel molded body after the primary sintering step at an ambient pressure of 5 to 300 MPa at a temperature in the range of 1500 to 2000° C., wherein
  the relative density of the spinel molded body after the primary sintering step is 95 to 96% and the relative density of the spinel molded body after the secondary sintering step is 99.8% or more. The invention according to claim 2 corresponds to this method for producing a spinel light-transmitting window material.

The step of molding a spinel powder to prepare a spinel molded body can be performed, for example, by dispersing the spinel powder in a dispersion medium to prepare a slurry, forming the slurry into a granule by spray-drying, then filling the granule in a die and pressing the granule into a predetermined shape. As the dispersion medium in which the spinel powder is dispersed, water and various organic solvents can be used.

In order to enable uniform dispersion, dispersants such as ammonium polyacrylate (in the case where the dispersion medium is water), ethyl oleate, sorbitan monooleate, sorbitan trioleate and a polycarboxylic acid dispersant (in the case where the dispersion medium is an organic solvent) may be added to the slurry. In addition, in order to facilitate formation of a granule, organic binders such as polyvinyl alcohol, polyvinyl acetal, various acrylic polymers, methyl cellulose, polyvinyl acetate, polyvinyl butylal, various waxes and various polysaccharides may be added to the slurry.

As described above, a high-purity powder is desired as the raw material spinel powder. However, organic substances, halogen and water, which are contained in the raw material, are allowed to be contained in the raw material at the stage prior to the primary sintering because they will be removed from the raw material in the primary sintering step and do not impair the feature of the spinel sintered body.

Examples of a pressing method include cold isostatic pressing (CIP). The pressure of pressing is preferably selected from the range within which the relative density of the spinel molded body after the primary sintering step is 95 to 96%, and it is usually 100 to 300 MPa.

After the spinel powder is molded into a predetermined shape, the resulting molded body is subjected to primary sintering. The primary sintering is a step in which the molded body is heated to 1500 to 1900° C. and sintered in an atmosphere of predetermined normal pressure or reduced pressure (vacuum). Preferable examples of the atmosphere of normal pressure or reduced pressure (vacuum) include an atmosphere of a reducing gas such as hydrogen and an atmosphere of an inert gas such as argon. The ambient pressure is preferably a reduced pressure (vacuum), and specifically, a pressure of about 1 to 200 Pa is preferable. The time of the primary sintering is preferably about 1 to 5 hours.

The production method of the present invention is characterized in that the relative density of the spinel molded body after the primary sintering step (spinel primary sintered body) is in the range of 95 to 96%. Herein, the relative density refers to a ratio of the actual density to the theoretical density of spinel (3.60 $g/cm^3$ at 25° C.) (theoretical density ratio, represented by %), and for example, the density (25° C.) of spinel whose relative density is 95% is 3.42 $g/cm^3$.

When the relative density is less than 95%, sintering in the secondary sintering step hardly proceeds, and a transparent spinel sintered body is hardly obtained. On the other hand, when the relative density is more than 96%, pores already existing in the spinel molded body tends to coalesce in the secondary sintering step, and pores having a largest diameter of not less than 100 μm are easily produced. Further, the number of pores increases, and a spinel sintered body, in which the number of pores having a largest diameter of not less than 10 μm per 1 $cm^3$ of the light-transmitting window material is not more than 2.0, is hardly obtained.

The relative density of the spinel molded body after the primary sintering step varies according to the density of the molded body before the primary sintering step, and the temperature and time of primary sintering. Further, the density of the molded body before the primary sintering varies according to the pressing pressure at the time of molding. Therefore, the relative density in the range of 95 to 96% can be achieved by adjusting the pressing pressure at the time of molding, and the temperature and time of primary sintering.

The spinel primary sintered body obtained by the primary sintering step is subjected to secondary sintering. The secondary sintering is a step in which the molded body is heated to 1500 to 2000° C., preferably 1600 to 1900° C., and sintered under pressure. The pressure of pressing is a pressure of 5 to 300 MPa, preferably about 50 to 250 MPa, and more preferably about 100 to 200 MPa. The time of the secondary sintering is preferably about 1 to 5 hours. Further, preferable examples of the atmosphere of the secondary sintering include an atmosphere of an inert gas such as argon.

The production method of the present invention is further characterized in that the relative density of the spinel molded body after the secondary sintering step (spinel sintered body) is 99.8% or more. The relative density after the secondary sintering step varies according to the pressure and temperature in the secondary sintering step and the time of the secondary sintering. Therefore, the relative density of 99.8% or more can be achieved by adjusting the pressure and temperature in the secondary sintering step and the time of the secondary sintering.

As described above, by adjusting the conditions in such a way that the relative density of the spinel molded body after the secondary sintering step is 99.8% or more, growth of grains of spinel in the sintering step is controlled, and therefore the coalescence of fine pores associated with the growth of grains of spinel can be suppressed. As a result of this, production of the pores having a largest diameter of more than 100 μm can be suppressed and the number of pores is suppressed, and a spinel sintered body composing the light-transmitting window material of the present invention can be obtained.

The spinel sintered body thus obtained undergoes the steps of cutting into a predetermined shape, grinding, and the like and is processed into a light-transmitting window material. The size and thickness of the light-transmitting window material may be determined according to required functions such as use conditions, the amount of far infrared rays transmitted, conductive heat quantity, and mechanical strength, and are not particularly limited.

As required, an antireflecting coating layer or a layer which achieves an optical effect may be formed on the surface of the light-transmitting window material made of a spinel sintered body. For example, the light-transmitting property can be further improved by forming the antireflecting coating layer on one side or both sides of the spinel sintered body used as the light-transmitting window material. As a result of this, it becomes possible to enhance the sensitivity of the window material.

The antireflecting coating layer is, for example, a layer of a metal oxide or a metal fluoride. As a forming method thereof, conventionally known physical vapor deposition methods (PVD methods), specifically, a sputtering method, an ion plating method, and a vacuum vapor deposition method can be employed.

Since the spinel light-transmitting window material of the present invention is formed of a spinel sintered body, it is superior in heat resistance and chemical resistance and has a high light-transmitting property for light in the visible light region to the middle infrared region. Further, in the light-transmitting window material of the present invention, light scattering factors are reduced and mechanical strength is high. Therefore, the spinel light-transmitting window material of the present invention can be suitably used as light-transmitting window materials such as a high-temperature sight glass of a vacuum container for producing a semiconductor, a window for a high temperature and high pressure environment, a window of sensors for applications of the visible light region to the middle infrared region, for example, a window for receiving infrared rays in an infrared detecting sensor of a missile or a flame detector, a light-receiving window disposed in electrical equipment for receiving signals from a remote controller, a window of a snooperscope, and a cover glass of a watch.

Advantageous Effects of Invention

A light-transmitting window formed by using the spinel light-transmitting window material of the present invention transmits light with excellent resolution since light scattering factors in the window are reduced. Moreover, since the light-transmitting window material is superior in mechanical strength such as break strength and has an improved Weibull coefficient which is an index of variations in strength, a stable product can be attained by using the light-transmitting window material. The spinel light-transmitting window material of the present invention can be easily obtained by the method for producing a spinel light-transmitting window material of the present invention.

DESCRIPTION OF EMBODIMENTS

Hereinafter, modes for carrying out the present invention will be described with reference to a specific example of the method for producing a spinel sintered body. However, the present invention is not limited to the following specific example. Various variations may be made as long as such variations are the same or equivalent to the invention.

EXAMPLES

[Step of Preparing Molded Body]

In the production of a spinel sintered body (the above-mentioned molded body) of this example, first, a slurry, in which a spinel powder (raw material powder) is dispersed, is prepared. The slurry can be prepared by mixing appropriate amounts of a high-purity spinel powder, a dispersion medium, a dispersant, and the like and mechanically stirring the resulting mixture.

Examples of the method of mechanically stirring the mixture include a method of mixing by a ball mill, a method of externally irradiating the mixture with an ultrasonic wave by use of an ultrasonic tank, and a method of irradiating the mixture with an ultrasonic wave by an ultrasonic homogenizer. The method using an ultrasonic wave is preferable because, by this method, the spinel powder is easily dispersed in the dispersion medium to form a uniform slurry, and a dispersion method using ceramic balls is thought to be susceptible to mixing of oxides or salts as impurities.

It is also possible to increase the spinel concentration in the slurry after stirring and mixing by static settling, centrifugal separation, or concentration under a reduced pressure with a rotary evaporator or the like.

In this specific example, 4750 g of a high-purity (purity 99.9% or more) spinel powder, 3100 g of water (dispersion medium), and 125 g of a 40% by weight aqueous solution of ammonium polycarboxylate (dispersant produced by SAN NOPCO Ltd.: trade name SN-D5468) were put in an ultrasonic tank, and the resulting mixture was stirred and mixed for 30 minutes while being irradiated with an ultrasonic wave. Thereafter, 1000 g of a 10% by weight solution of polyvinyl alcohol (produced by KURARAY Co., Ltd.: trade name PVA-205C) as an organic binder and 10 g of polyethylene glycol

400 (analytical grade reagent) as a plasticizer were added, and the resulting mixture was stirred and mixed for 60 minutes to prepare a slurry.

As the ultrasonic tank, a tank with a capacity of 40 L was used. The time of agitation and mixing has to be appropriately adjusted according to the amount of the slurry and the irradiation amount of the ultrasonic wave, and for example, agitation and mixing are preferably performed for 30 minutes or more when the amount of slurry is 10 L and an ultrasonic tank having an ultrasonic irradiation capacity of about 25 kHz is employed.

Next, the slurry was formed into a granule by spray-drying, the water content of the granule was adjusted to 0.5% by weight, and then the granule was filled into a die, primarily molded at a pressure of 196 MPa by pressing, and further secondarily molded at a pressure of 196 MPa by cold isostatic pressing (CIP) to prepare a spinel molded body.

[Primary Sintering Step]

The molded body was put in a graphite container, and primarily sintered at 165° C. for 4 hours in a vacuum (5 Pa or less). The relative density was measured according to an Archimedes method, and consequently it was 95.8% (that is, in the rage of 95 to 96%).

[Secondary Sintering Step]

The primary sintered body was subjected to heating/pressurizing at 1650° C. for 2 hours by hot isostatic pressing at an ambient pressure of 196 MPa in an argon atmosphere to prepare a secondary sintered body. The relative density was measured according to an Archimedes method, and consequently it was 99.9% (that is, 99.8% or more).

The spinel secondary sintered body obtained by the above-mentioned method was cut into a plate with a thickness of about 10 mm to prepare a light-transmitting window material made of a spinel sintered body. Both sides of the obtained light-transmitting window material was mirror-finished by use of a grinding machine (NF-300 manufactured by Nano Factor Co., Ltd.) to obtain a 20 mm square light-transmitting window material having a thickness of 10 mm (volume 4 $cm^3$). The light transmittance of the light-transmitting window material at a wavelength of 3 to 5 μm was measured, and consequently it was 84% (thickness 10 mm).

[Observation of Pores]

The surface of the light-transmitting window material was observed at a magnification of 50 times by use of an optical microscope (manufactured by NIKON Corp.: T-300), and the pore size and number of pores having a largest diameter of not less than 10 μm were measured. As a result, the largest diameter of pores was not more than 13 μm, and therefore no pore having a largest diameter of more than 100 μm was observed. Further, the observed number of pores having a largest diameter of not less than 10 μm was 5, that is, 1.25 per 1 $cm^3$ or not more than 2 per 1 $cm^3$.

[Measurement of Mechanical Strength]

Using a sample of the spinel secondary sintered body obtained by the above-mentioned method, a three-point bending test according to JIS R 1601 was performed (n=15). As a result of this, the mechanical strength was 426 MPa and the Weibull coefficient was 9.

As shown in the results described above, in accordance with the production method of the present invention, a light-transmitting window material made of a spinel sintered body, wherein the largest diameter of pores contained in the light-transmitting window material is not more than 100 μm, and the number of pores having a largest diameter of not less than 10 μm is not more than 2 per 1 $cm^3$ of the light-transmitting window material, was obtained. This light-transmitting window material formed of a spinel sintered body is reduced in light scattering factors and has excellent mechanical strength.

Comparative Examples 1 to 3

Light-transmitting window materials made of a spinel sintered body were prepared in the same manner as in the above example (specific example) except that the production conditions were changed in such a way that the relative density after the primary sintering step and the relative density after the secondary sintering step were values shown in Table 1, and pores were observed and mechanical strength was measured on each of the prepared window materials. The results of measurement are shown in Table 1 together with the results of measurement in the above example (specific example). (Primary sintering density and secondary sintering density in Table 1 represent the relative density after the primary sintering step (%) and the relative density after the secondary sintering step (%), respectively.)

TABLE 1

| | Primary sintering density | Secondary sintering density | Largest pore diameter μm | Number of pores | Strength MPa | Weibull coefficient |
|---|---|---|---|---|---|---|
| Example | 95.8 | 99.9 | 13 | 1.25 | 426 | 9 |
| Comparative Example 1 | 94 | 97 | 300 | 42 | 250 | 6 |
| Comparative Example 2 | 96.5 | 99.5 | 150 | 8 | 330 | 7 |
| Comparative Example 3 | 98 | 99 | 430 | 3 | 294 | 6 |

As is apparent from the results in Table 1, in the example according to the production method of the present invention, the spinel light-transmitting window material of the present invention was obtained, but in Comparative Examples 1 to 3 in which the relative density after the primary sintering step was out of the rage of 95 to 96% and the relative density after the secondary sintering step was less than 99.8%, pores having a largest diameter of more than 100 μm were produced and the number of pores having a largest diameter of not less than 10 μm was large, and therefore the spinel light-transmitting window material of the present invention was not obtained. It is also understood from the results in Table 1 that in these cases, mechanical strength and Weibull coefficient were low.

The invention claimed is:

1. A light-transmitting window material made of a spinel sintered body, wherein said light-transmitting window material contains pores having a largest diameter of not less than 10 μm and not more than 100 μm and the number of pores having a largest diameter of not less than 10 μm is not more than 2.0 per 1 cm$^3$ of said light-transmitting window material.

2. A method for producing a spinel light-transmitting window material comprising the steps of:

molding a spinel powder to prepare a spinel molded body;

a primary sintering step of sintering said spinel molded body at normal pressure or less or in a vacuum at a temperature in the range of 1500 to 1900° C.; and a secondary sintering step of sintering the spinel molded body after the primary sintering step at an ambient pressure of 5 to 300 MPa at a temperature in the range of 1500 to 2000° C., wherein the relative density of the spinel molded body after the primary sintering step is 95 to 96% and the relative density of the spinel molded body after the secondary sintering step is 99.8% or more, the relative density is a ratio of the actual density to the theoretical density of spinel, and the step of preparing said spinel molded body includes the step of molding said spinel powder at a pressure of 100 to 300 MPa by cold isostatic pressing.

* * * * *

UNITED STATES PATENT AND TRADEMARK OFFICE
CERTIFICATE OF CORRECTION

| | | |
|---|---|---|
| PATENT NO. | : 8,673,796 B2 | Page 1 of 1 |
| APPLICATION NO. | : 13/262311 | |
| DATED | : March 18, 2014 | |
| INVENTOR(S) | : Masashi Yoshimura et al. | |

It is certified that error appears in the above-identified patent and that said Letters Patent is hereby corrected as shown below:

On the Title Page, Item (56) References Cited, the last document in Foreign Patent Documents listed as "WO 2010/11403 A1" should read --WO 2010/114035 A1--.

Signed and Sealed this
Ninth Day of September, 2014

Michelle K. Lee
*Deputy Director of the United States Patent and Trademark Office*